July 8, 1958
P. D. MERRILL
2,842,383
SECTIONAL GASKET RING FOR BELL JOINT CLAMP
Filed Feb. 3, 1953
2 Sheets—Sheet 1
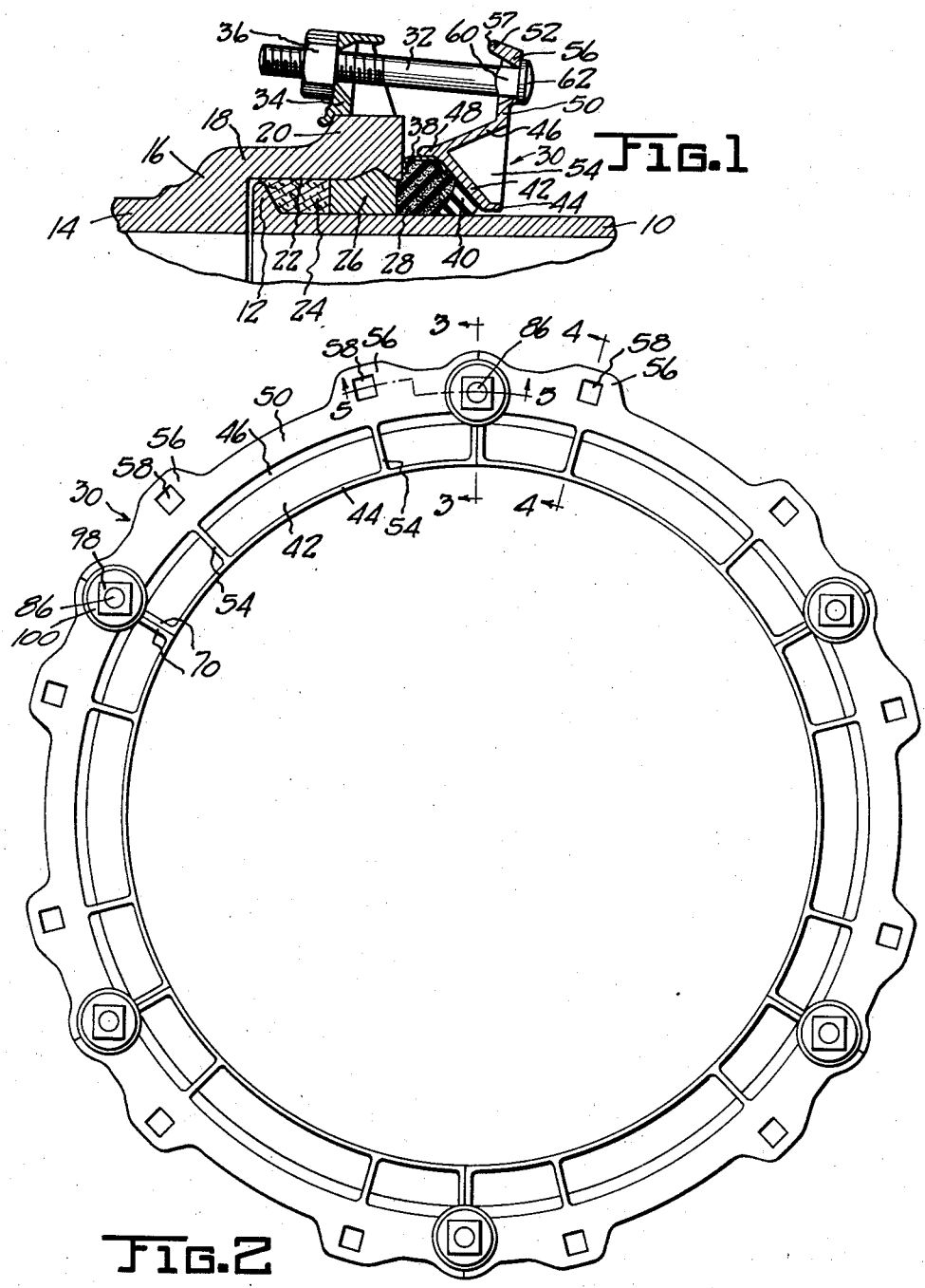
INVENTOR.
PATTERSON D. MERRILL.
BY
Eugene C. Knoblock
ATTORNEY.

July 8, 1958  P. D. MERRILL  2,842,383
SECTIONAL GASKET RING FOR BELL JOINT CLAMP
Filed Feb. 3, 1953  2 Sheets-Sheet 2

PATTERSON D. MERRILL.
INVENTOR.

BY Eugene C. Knoblock
ATTORNEY.

United States Patent Office 2,842,383
Patented July 8, 1958

2,842,383

SECTIONAL GASKET RING FOR BELL JOINT CLAMP

Patterson D. Merrill, South Bend, Ind., assignor to M. B. Skinner Company, South Bend, Ind., a corporation of Indiana Application February 3, 1953, Serial No. 334,820

3 Claims. (Cl. 285—413)

This invention relates to a sectional gasket ring for bell joint clamps. More particularly, it relates to a ring adapted to be employed for the purpose of pressing a gasket against the end of a bell of a bell and spigot pipe joint for the purpose of preventing leakage at such a joint.

The usage of large pipes, that is, pipes having a diameter of 14 inches or more is increasing in pipelines for oil, gas and other liquids and fluids. These lines are frequently manufactured from pipe sections having bell and spigot joint connections at which leaks may develop. The conventional method of sealing such leaks is to apply a bell joint pipe leak sealing clamp at the leaking joint. Such clamps usually include an anchor ring encircling the pipe and bearing endwise against a flange or lip of the bell portion thereof, a gasket pressing ring encircling the other pipe section forming part of the joint to press a gasket against the end of the bell of the joint, and draw bolts extending between the gasket ring and the anchor ring and serving to draw the gasket ring toward the bell to press the gasket into sealing engagement with the pipe at the joint. The two rings, namely the anchor ring and the gasket ring, have usually been formed in two semi-circular parts connected together by bolts and nuts. The two-part construction of such rings is feasible in clamps for pipes having diameters of less than 14 inches. Where clamps are being prepared for pipes of diameters of 14 inches and greater, the semi-circular ring sections are no longer practical.

Clamp rings are commonly formed from malleable castings. These castings are hard and brittle as cast and before they are annealed. Experience has shown that the casting of semi-circular ring parts for pipes of 14 inches and greater in diameter is costly because the large size of the sections results in many defective castings. The percentage of acceptable castings may fall as low as 10 percent of the total number of castings in such large sizes; hence attempts to cast semi-circular ring parts are quite wasteful and costly. The large size required, where the semi-circular castings are produced, presents another problem from the standpoint that only a comparatively small number of foundries have the equipment enabling them to mold the large size ring sections. Because of the difficulties of the work and the large amount of waste involved, the foundries equipped to do the work frequently do not wish to undertake it. Therefore, it is expedient to form the rings in more than two sections, but formation of the rings in more than two sections introduces problems which necessitate alignment of ring sections by the joint. Included among the problems are the maintenance of the sections in a common plane; the drawing together of the adjacent sections in a true circumferential direction to avoid radial stresses; the arrangement of the parts so as to accommodate substantially longitudinal pull by the draw bolt; the proper alignment of the faces at the ends of the sections so that the gasket engaging conical surfaces of adjacent sections are substantially flush, that is, so that they lie in proper orientation about a single or common axis; the provision of a unit which has a substantially uniform wall thickness so as to avoid shrinkage of metal between heavy and thin parts; and the provision of adequate strength to assure that the rings will permit the application of the full force required for its proper use and operation.

It is the primary object of this invention to provide a sectional gasket ring construction which will satisfy all of the foregoing requirements.

A further object is to provide a sectional gasket ring having conical hollow projections which receive a connector bolt, and wherein the bolt and nut used therewith have conical recesses interfitting with the conical ring projections to properly orient the adjacent ring sections and in which the conical projections have opposed flat surfaces associated therewith tending to provide a relief avoiding the necessity for continuous contact between the conical projections and the conical fastener parts whereby the fastener parts are enabled to draw the ring sections together in a circumferential direction and to avoid radial stresses.

A further object is to provide a joint between ring sections defined in part by cooperating tube-forming portions having a common axis in the parting plane of the sections and whose ends are received in sockets formed, respectively, in a bolt head and in a nut positioned co-axially with said tube-forming parts, and wherein said socketed bolt head has an interlocking relation with the ring sections to prevent rotation of the bolt as a nut is drawn tight thereon.

Other objects will be apparent from the following specification.

In the drawings:

Fig. 1 is a transverse sectional view taken on line 4—4 of Fig. 2, and illustrating a bell joint pipe leak seal.

Fig. 2 is a face view of an assembled multi-sectional ring.

Figure 3:
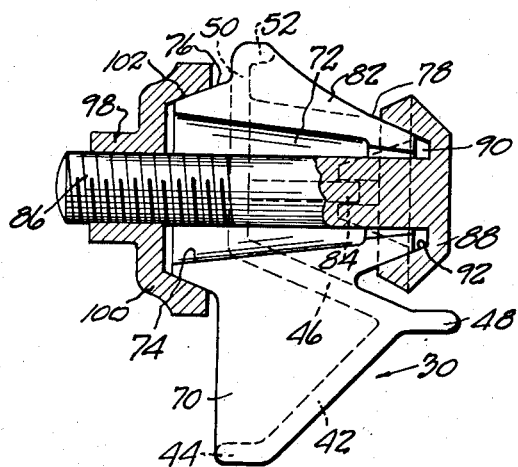
Fig. 3 is an enlarged sectional view taken on line 3—3 of Fig. 2.

Referring to the drawings which illustrate the preferred embodiment of the invention, the numeral 10 designates a pipe having a circumferential flange 12 at one end commonly referred to as the spigot end. At the opposite end the same pipe has a thickened wall portion 14 with which merges the outwardly projecting shoulder portion 16 of a bell 18 which terminates in an enlarged flange 20. The bore 22 of the bell will be of a diameter larger than the spigot flange 12. The spigot part of one pipe section will fit within the bore 22 of the other pipe section, as illustrated in Fig. 1, and a packing or sealing material 24 is positioned in the annular cavity between the parts 10 and 18 to seal the joint, said sealing material being held in place by an outer ring 26 of material, such as lead, which holds the sealing material in place.

When leaks occur at such a joint it is the common practice to employ a gasket ring 28 formed of rubber or like material and of substantially triangular construction which encircles the pipe 10 and bears against the end of the bell of the other pipe and against the seal retainer 26 at the joint. This sealing ring 28 is engaged by a gasket pressing ring 30 which encircles the pipe 10 to bear against the frusto conical surface of the sealing ring 28. The gasket engaging ring 30 is drawn toward the bell by draw bolts 32 which extend to an anchor ring 34 encircling the bell 18 and seating against the pipe flange 20. A nut 36 is threaded upon each draw bolt 34 and, upon rotation, acts to draw the gasket ring toward the bell. A metal ring 38 commonly encircles the gasket and serves as a retainer for the gasket so that upon application of pressure to the gasket 28 in a longitudinal or axial direction, the gasket ring is confined and caused to assume a configuration in conformity with the surfaces of the pipe sections at which the leak occurs. It may be mentioned in this connection that the tip 40 of the gasket may be formed from a rubber of harder consistency than the remaining parts of the gasket, thereby serving to prevent extrusion of the rubber between the pipe 10 and the inner periphery of the gasket ring.

This invention relates primarily to the gasket pressing ring 30. The gasket pressing ring has a frusto conical gasket engaging wall 42 from whose inner end projects a short substantially cylindrical flange 44. A reverse frusto conical wall 46 merges with the large diameter end of the frusto conical wall 42 so that the combined parts 42 and 46 have a substantial V-shape in cross section. A flange 48 projects from the junction of the parts 42, 46, being substantially cylindrical and of short axial dimension. A web 50 projects outwardly from the large diameter end of the wall 46, the same being substantially flat and lying in a plane substantially perpendicular to the axis of the ring. A flange 52 is preferably formed at the outer margin of the web 50 for reinforcing purposes.

The ring 30 is formed of a plurality of similar sections. As here shown, the ring has six sections, but it will be understood that this number is illustrative and that the ring may be formed from any number of sections desired or found suitable, and preferably will be formed of more than two sections. The ring sections are preferably similar in all structural and dimensional properties. Each section is provided at spaced points along its length and spaced from the ends thereof with substantially radial flanges 54 integral therewith and spanning the cavity or recess between the walls 42 and 46. At points 56 substantially radially aligned with these flanges 54, the web 50 is widened to define ears which are provided with apertures 58. The apertures 58 are preferably square or of other non-circular shape and each is adapted to receive the square or non-circular portion 60 of a draw bolt 32 adjacent to the head 62 of the draw bolt which bears against the ear or enlargement 56 around the aperture 58.

Figure 4:
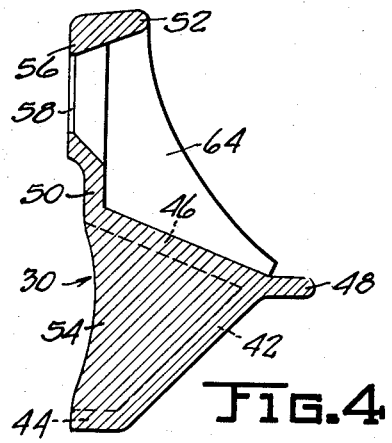
Fig. 4 is an enlarged sectional view of the gasket ring taken on line 4—4 of Fig. 2.

The marginal flanges 52 of the web 50 continue around the ears 56 at 57. Substantially radial flanges 64 serve to reinforce the ear portions 56, the same being located at opposite sides of the aperture 58 and located, as best illustrated in Fig. 4, to extend from the marginal flange or rib 57 across the full width of the web 50 and along substantially the full width of the frusto conical wall 46. These flanges are spaced apart a distance greater than the dimension of the aperture 58 and preferably are located adjacent to but on opposite sides of the radial plane of the ribs or flanges 54, and also are positioned or located at the side of the ring opposite that at which the flanges or ribs 45 are located.

Figure 7:
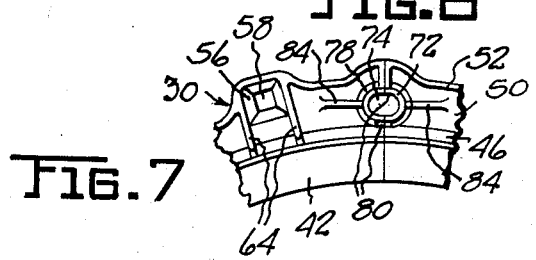
Fig. 7 is a fragmentary view of the ring joint similar to Fig. 6, but with the securing means removed.

At each end of each section is located a substantially radial wall 70 which substantially spans the space between the frusto conical wall portions 42 and 46 and which merges with a part tubular wall portion 72 whose axis lies in the plane of the outermost or end surface of the wall 70 and extends substantially parallel to the axis of the gasket engaging ring assembly and its cylindrical flanges 44 and 48. The tube defining portion has a substantially uniformly tapered bore 74 whose small diameter end lies adjacent to the cylindrical rib 48 and whose large diameter portion lies adjacent to the rib 44. The part 72 projects in an axial direction from the web 50 with which it is integrally formed and extends longitudinally a substantial distance in one direction beyond the end of the flange 42. In the opposite direction the tubular part 72 extends longitudinally from the web 50 to an extent substantially equal to the depth of the V defined by the walls 42 and 46. The outer surface of the part 72 at each end thereof is frusto conical, there being provided at the end having the largest bore section a frusto conical surface 76 whose taper extends oppositely to the taper of the bore 74 and there being provided at the other end of the member 72 a frusto conical surface 78. At the inner or small diameter end portion 78, the construction is preferably flattened substantially, as illustrated in Fig. 7, at the inner and outer surfaces as determined with relation to the radius of the ring 30. These flattened portions are designated 80, and the purpose thereof will be mentioned subsequently. The outer surface of the part 76 at the other end of the tube-forming projection also preferably has flats (not shown) at its inner and outer portions as determined with relation to the radius of the ring 30. A web or plate 82 extends between each part 78 and the margin of the web 50 for reinforcing purposes, the same lying in a plane flush with the web 70 but projecting at the side of the ring opposite the web 70 and terminating spaced from the tip of the portion 78, as best seen in Fig. 3. Integrally formed with each part 78 and the web 50 is a flange 84 projecting substantially perpendicular to the web 50 and to the web 82 and also terminating spaced from the tip of the part 78, as best seen in Fig. 5.

Figure 5:
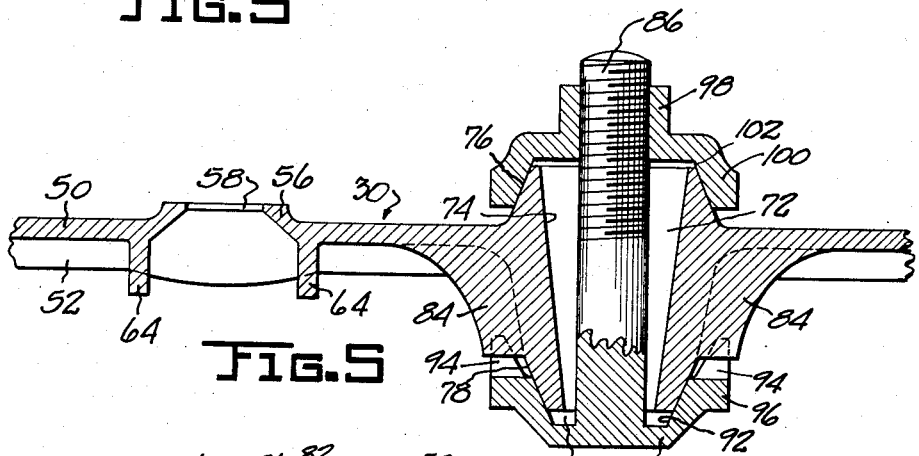
Fig. 5 is an enlarged fragmentary sectional view taken on line 5—5 of Fig. 2.
Figure 6:
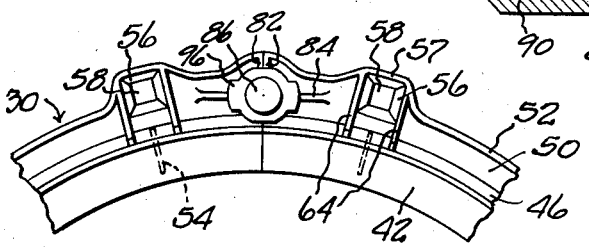
Fig. 6 is a fragmentary view of the ring illustrating the face opposite that shown in Fig. 2.

The adjacent sections of the ring 30 are joined together by a bolt and nut unit of the construction and arrangement best illustrated in Figs. 3 and 5. The bolt has a shank 86 of a length greater than the tube-forming part 72 of each ring section, the same being screw-threaded at its outer end. The head 88 of the bolt has an annular socket 90 formed therein whose outer surface 92 is frusto conical and substantially mates with the frusto conical surface 78. The annular socket is of a depth preferably less than the spacing of the ends of the flanges 84 from the outer end of the part 78, and its smallest diameter is preferably less than the diameter of the tip end of part 78. Two sets or pairs of circumferentially spaced ears or lugs 94 are carried by the marginal portion 96 of the head 88 of the bolt and extend substantially longitudinally therefrom. The sets of lugs or ears 94 are arranged in substantially diametrically opposed relation and the ears of each pair are spaced apart a distance slightly greater than the width of the web 84. The arrangement is such that the lugs 94 straddle the outer ends of the ribs 84 as the socket 90 of the head fits around the mating tube-forming parts 78 so as to hold the bolt head against rotation. A nut 98 is mounted on the threaded shank 86 of the bolt and has a skirt portion 100 which projects from the nut and cooperates therewith to form a dished construction having an inner surface 102 of frusto conical configuration conforming substantially to the configuration of the frusto conical outer surface of the tube-defining end portion 76, but with its small diameter part preferably smaller than the tip portion 76. It will be apparent from Figs. 3 and 5 that, when the nut 98 is drawn tight on the shank of the bolt, the frusto conical surface 92 will engage the frusto conical surfaces 78 of the ring sections at one end thereof, while the frusto conical surface 102 of the end will engage the frusto conical surfaces 76 at the other end of the tube-forming portions of the ring.

The ring 30 is readily and quickly fabricated from the individual sections on the job. Thus the problem of shipping a large diameter ring is avoided because the individual sections are small and the size of a carton to receive the components of a single ring can be much smaller than a carton which would be required for a ring made in only two parts.

Another advantage of the construction is that the ring will be assembled and maintained in rigid operative planar position when assembled, and, further, the particular arrangement of the sections of the ring is not important since each ring section is constructed similarly to all of the others and the end of any one section will match the end of an adjacent ring section.

One of the important characteristics of this device is the fact that the assembly of the ring by means of the bolts and nuts involves tightening of the joints in a direction to pull the adjacent sections together circumferentially. This results from the fact that the parts 76 and 78, projecting from the web and mating with similar parts of the adjacent section, have conical outer surfaces upon which the surface 92 of the bolt head and 102 of the nut skirt pilot and bear. Consequently, as the nut is tightened on the bolt there will occur, in addition to the movement of the nut longitudinally on the bolt in a direction parallel to the axis of the ring, a movement of the ring sections circumferentially in the direction of each other to bring the ends of abutting sections into firm full face anchorage and abutment. Thus the longitudinal movement of the nut upon the bolt has a component of movement perpendicular thereto effective to draw the ring sections toward each other.

Another advantage of this double cone construction with sockets on the bolt head and the nut is that it provides automatically for the proper registration of the faces as they are brought together. Thus a single securing member between the abutting end portions of two adjacent ring sections is all that is required to effect register of the sections. In this connection it may be mentioned also that initial disalignment of the adjacent ring sections is prevented by the interlocking relation of the projections 94 on the bolt head 88 with the ribs 84 upon the ring sections. The interlocking relation of the parts 94 and 84 serves to hold the ring sections in approximate register during initial movement of the securing members toward tightened position. This action is only approximate, however, but as the tightening action proceeds so that the conical surfaces 92 and 78 engage at one end of the tube, and conical surfaces 102 and 76 engage at the other end of the tube, any inaccuracies of register are corrected and an effective and accurate joint is produced. The interlocking projections 94 and ribs 84 serve the additional obvious purpose of preventing turning of the bolt during the tightening of the nut thereon in the assembly operation.

The taper of the groove 74, while not strictly necessary, is preferred for strength and for maximum surface engagement of the interfitting frusto conical parts. Thus the skirt 100 of the nut 98 may have a much larger inner diameter than the corresponding diameter of the groove wall 92 in the bolt head. Also, the arrangement permits the maximum dimensions of the various parts while at the same time locating the center of the anchoring bolt as near as possible to the inner flange 44 of the ring. In this connection it will be apparent that the conical end portion 78 must be spaced from the apex of the portion of the ring between the walls 42 and 46 in order to provide clearance to receive the bolt head. Nothing interferes with or limits the size of the opposite end adjacent the mouth of the V-shaped groove between the walls 42 and 46 so its size may be increased.

Another characteristic of the device is that the securing or anchoring bolts 86 are oriented or positioned substantially at the same radial spacing from the center of the pipe 10 as are draw bolts 32 which serve to move the ring axially to compress the gasket 28. This facilitates the orientation of the draw bolts 32, substantially as illustrated in Fig. 1, into substantial parallelism with the pipe 10 rather than at a sharp angle as has frequently been required in this art by previous ring constructions.

The tubular construction of the portions 72, which cooperate with the bolt and nut to draw the ring sections together, serves the important function of making possible the maintenance of the wall thickness of the ring section substantially uniform throughout. The rings are usually formed of malleable iron, and one characteristic of this material is that the occurrence of any heavy concentration of metal at a localized area may result in in shrinkage of the metal between the heavy and the thin parts with resultant weak points in the casting. The present design avoids such inequalities of wall thickness as would produce such weak points.

Another inherent characteristic of the tube-forming construction of the parts 72 is its inherent strength which, being in the order of the strength of any tube, is very great as compared to other structural shapes.

A further advantage of the present device is that the ring sections are so firmly and accurately and strongly held together that a ring made therefrom will be strong, will lie substantially in a common plane, and will resist distortion. Consequently, as the ring is pulled upon successively by draw bolts 32 at different parts of the ring, it will maintain its shape, it will be drawn uniformly, and it will apply uniform compression to the gasket at all circumferential parts thereof. The uniformity of gasket compression is obviously important to insure required leak sealing engagement of the gasket with a leaking pipe.

While the preferred embodiment of the invention has been illustrated and described, it will be understood that changes may be made in the construction within the scope of the appended claims without departing from the spirit of the invention.

I claim:

1. A gasket ring for a pipe leak clamp, comprising a plurality of similar arcuate sections, each section including an end wall engageable with the end wall of an adjacent section and interrupted by an elongated tube-forming end portion of substantially semi-circular cross-sectional shape whose axis is substantially parallel to the axis of said ring and which projects from both sides of said ring section, a bolt including a shank portion and a head having an annular groove in its inner face, and a nut threaded on said shank and including a circular skirt portion projecting therefrom, the opposite ends of the tube-forming portions of adjacent abutting ring sections being of dimensions to be received and confined in said groove and skirt portion, respectively, the outer surfaces of the ends of said tube-forming portions being tapered and cooperating with the tube-forming portion of the adjacent ring section to define substantially frusto conical surfaces respectively tapering in opposite directions with their minimum dimensions outermost, said groove and skirt portion each having substantially frusto conical surfaces substantially complementally engaging said first named frusto conical surfaces, the frusto conical shape of said tube forming portions being interrupted by substantially flat surfaces adjacent the parting plane between adjacent ring sections.

2. A gasket ring for a pipe leak clamp, comprising a plurality of similar arcuate sections in end abutment, each section including an elongated tube-forming end portion of substantially semi-circular cross-sectional shape whose axis is substantially parallel to the axis of said ring and which projects from both sides of said ring section, a bolt including a shank portion and a head having an annular groove in its inner face, and a nut threaded on said shank and including a circular skirt portion projecting therefrom, the opposite ends of the tube-forming portions of adjacent abutting ring sections being substantially frusto-conical with the small dimension thereof endmost and being received and confined in said groove and skirt portion, respectively, each tube-forming portion having an external projection spaced from its end a distance greater than the depth of the groove of said bolt head, and means projecting from said bolt head alongside said shank and outwardly of said tube-forming portions engaging the projections on the tube-forming parts to prevent rotation of said bolt.

3. A gasket ring for a pipe leak clamp, comprising a plurality of similar arcuate sections in end abutment, each ring section having an inner portion of V-shape in cross-section defined in part by a frusto conical gasket engaging wall and an integral outer reversal frusto-conical wall, end walls at each end of each section and including a radial inner portion spanning said V-shaped inner portion and an outer configured portion presenting a groove at the parting plane between ring sections, sand configured portion projecting from said web at opposite sides thereof and cooperating with a similar portion of an abutting ring section to define a tube whose axis extends parallel to the axis of said ring, the outer surfaces of said tube tapering oppositely at opposite end portions of said tube, a bolt having a shank extending through said tube and a head having an annular socket receiving one end portion of said tube, and a nut having a circular skirt embracing the other end portion of said tube, said bolt head and nut skirt circumferentially engaging the tapered ends of said tube, and interlocking projections and sockets on said configured tube portions and bolt interengaging in spaced relation to said bolt head for holding said bolt against rotation.

References Cited in the file of this patent

UNITED STATES PATENTS

| | | |
|---|---|---|
| 1,921,629 | McKee | Aug. 8, 1933 |
| 2,115,670 | Merrill | Apr. 26, 1938 |
| 2,415,753 | Newell | Feb. 11, 1947 |
| 2,467,004 | Battey | Apr. 12, 1949 |